United States Patent [19]

Butts

[11] Patent Number: 4,488,036

[45] Date of Patent: Dec. 11, 1984

[54] KEYCARD READER

[75] Inventor: Lawrence D. Butts, Charlotte, N.C.

[73] Assignee: Scovill Inc., Waterbury, Conn.

[21] Appl. No.: 422,216

[22] Filed: Sep. 23, 1982

[51] Int. Cl.³ .................... G06K 13/00

[52] U.S. Cl. .................... 235/482; 235/485

[58] Field of Search .................... 235/482, 485, 483

[56] References Cited

U.S. PATENT DOCUMENTS 3,926,021 12/1975 Genest .................... 235/482

3,946,438 3/1976 Altmann .................... 235/482

4,036,430 7/1977 Eppich .................... 235/482

*Primary Examiner*—Harold I. Pitts

*Attorney, Agent, or Firm*—Dallett Hoopes

[57] ABSTRACT

Keycard reader has entry slot aimed at an angle to the vertical and a vertical lower portion so that flexible keycard is bent as it is inserted. This provides a convenient entry, precludes the malicious insertion of coins, sticks, and other objects into reader to render it inoperative, blocks light into the reader and makes it unnecessary to make an enlarged opening in the door to receive the lock.

4 Claims, 5 Drawing Figures

KEYCARD READER

CROSS REFERENCE TO RELATED APPLICATION

This utility patent application is related to an earlier-filed design application Ser. No. 6-308,819, filed by the Applicant Oct. 5, 1981. While the earlier-filed design application is directed to the same device, it does not disclose or claim the invention of the present application.

BACKGROUND OF THE INVENTION

1. Field of the Invention

This invention relates to keycard readers. More specifically, this invention relates to keycard readers in which the reader is generally part of a door lock as in a hotel, and the keycard is in the form of a preferably stiffly flexible card, perforated or otherwise coded to be read in the reader.

2. Description of the Prior Art

There are several showings in the prior art of keycard readers adapted for use on door locks. An example is shown in the Reissue Pat. No. 29,846 based on U.S. Pat. No. 3,926,021 which issued Dec. 16, 1975 to Leonard J. Genest et al. Earlier showings exemplify the problem connected with structures of the prior art. In such structures, the card is in the form of a more or less rigid flat rectangular structure which is inserted into a slot in the door lock escutcheon, the slot having generally a straight, inclined channel adjacent the handle of the door. The channel includes a reader. Typically, the arrangement is installed in the door of a hotel room and the guest is given a keycard at the front desk, which keycard is perforated or otherwise coded to be read by the reader prior to the unlocking of the door.

The keycard readers of the past have had straight key-receiving channels and often been vulnerable to idiotic vandalism during which coins, paper, sticks, etc. have been stuffed in the receiving slot of the reader. With such material wedged into the opening, the reader has been rendered inoperative and technicians have had to be sent up to restore the unit to operation.

Also, the straight keycard-receiving channels of the prior art have been inclined from the vertical to provide a convenient insertion angle for the user. Because of the length of the card and the related parts, however, this has often required a larger hole in the door to permit the mounting of a reader designed with an angled and straight keycard-receiving channel. The larger hole has resulted in a weakening of the door such that indeed sometimes the door would fail to pass the required fire safety codes.

SUMMARY OF THE PRESENT INVENTION

Under the present invention, the lower portion of the key-receiving channel is vertical, parallel to the surface of the door and disposed in structure on the front facing the door. The upper portion of the keycard-receiving channel is angled somewhere between the vertical and horizontal (preferably 25°) and curves to join the lower portion. Preferably, the keycard reading device is disposed just beneath the curved portion. A stiffly flexible keycard is used. Because of this structure, it is possible to insert the keycard in the slot which comprises the upper end of the channel and at an angle convenient and so as not to require the sighting of the card into the slot. The unit is, in other words, "user friendly". As it is inserted farther, the card bends at the curved portion and extends down the vertical run of channel therebelow. The reading is done as the card passes the reading device.

BRIEF DESCRIPTION OF THE DRAWINGS

Further features and objects of the invention will be apparent from a reading of the following specification and an examination of the drawings, all of which disclose a non-limiting embodiment of the invention. In the drawings.

DESCRIPTION OF THE PREFERRED EMBODIMENT OF THE INVENTION

Figure 1:
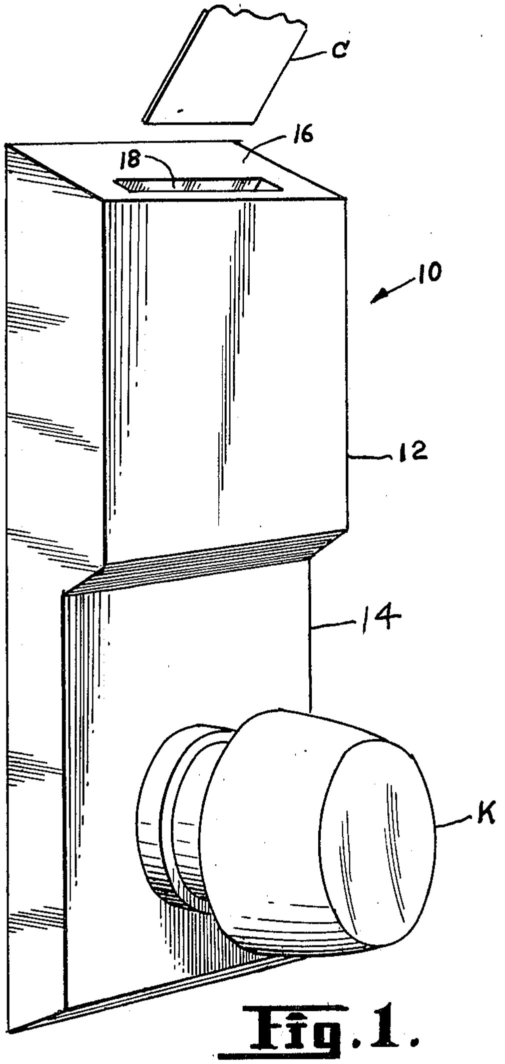
FIG. 1 is a perspective view of the outside of a reader embodying the invention, the reader housing comprising part of the eschutcheon of a door lock.
Figure 2:
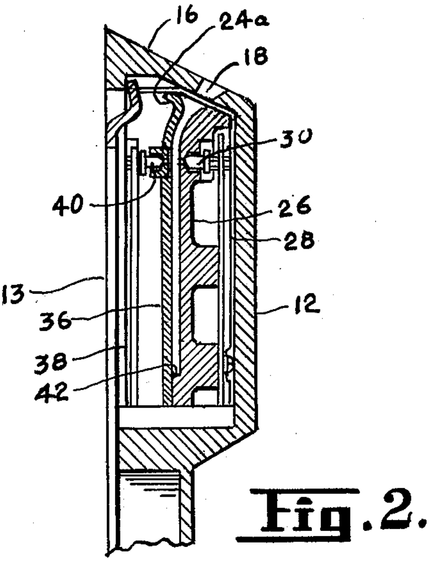
FIG. 2 is a fragmentary side view having part of the housing broken away to reveal the internal structure of the eschutcheon.
Figure 5:
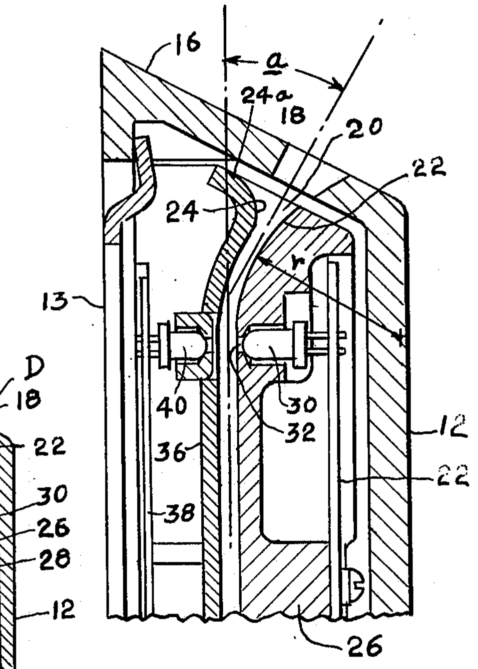
FIG. 5 is a fragmentary, greatly enlarged section of the upper portion of the keycard reader.

Referring more specifically to the invention, a keycard reader embodying the invention is generally designated 10 in FIG. 1. It is enclosed by a housing 12 mounted on bracket 13 (as shown) and which projects outwardly from the upper end of an escutcheon 14 built around the spindle of the door lock knob K. The upper surface of the eschutcheon is an outwardly and downwardly inclined wall 16 formed with a slot 18 to receive the keycard C. As is best shown in FIGS. 2 and 5, the slot 18 is aligned with the opening in the upper end 20 of a channel which is defined by two curved surfaces 22, 24 presenting the entrance thereof.

More specifically, the upper end of the channel 20 is defined by an outer surface 22 which is an inner face of the frame, generally designated 26. To this frame may be mounted a control card 28 including the reader elements 30, accessible to the card channel 20 through openings 32.

The surface 24, correspondingly curved after a short entrant lip 24*a*, is shaped from a guide plate 36 secured to the frame 26 by means as shown. Also secured to the frame is the second control card 38 which carries the reading lights 40 aligned in a horizontal row corresponding to the row of reader elements 30.

It will be noted that the wall defining the lower portion of the card channel, and also the lower portion of the guide plate 36, are vertical.

Figure 4:
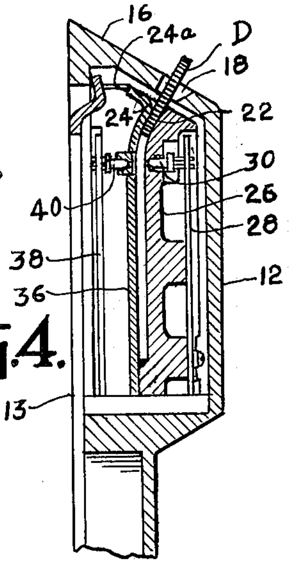
FIG. 4 is similar to FIG. 3 showing how the arrangement of the invention thwarts the insertion of a coin or matchstick into the keycard reader slot.

Special attention is directed to FIG. 5 which shows the relationship between the entrant path and the vertical. The entrant path may be defined as the line on which a thin straight object, such as a dime D (FIG. 4) or straight, unbent keycard lies when its lower end abuts the wall of the guide plate 36 inside the reader as does the dime in FIG. 4. The path and the vertical meet in an angle a (FIG. 5).

This arrangement is an essential part of the invention for it means that any straight, rigid, object such as a popsicle stick, or coin, maliciously inserted through the opening 18 will penetrate only so far until it abuts the commencement of the straight section of the guide plate 36. For instance, in FIG. 4, a coin such as a dime D will be only insertable to the position shown in FIG. 4 whereupon it will be readily removed without use of tools because a section of it protrudes through the opening 18.

Figure 3:
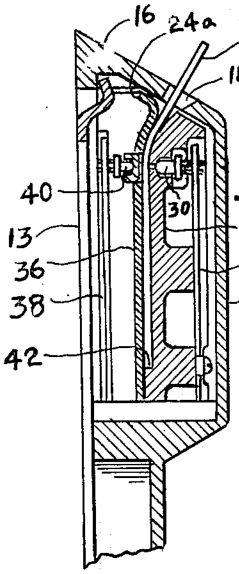
FIG. 3 is a fragmentary side view similar to FIG. 2 showing the insertion of a stiffly flexible keycard in accordance with the invention.

On the other hand, the flexible card C may be inserted its full length (FIG. 3) until it bottoms out at the bottom of the channel defined by a horizontal ledge 42 (FIG. 3).

Selection of the angle a between the path of the insert and the vertical is important, and it has been found that an angle of approximately 25° is far preferred although an angle from 20° to 40° would retain some of the benefits of the invention. For ease of operation, it has been found that the radius r (FIG. 5) of the curved section is desirably on the order of 0.5 inch.

It is to be noted that the lights 40 and reader elements 30 are disposed in the card-receiving channel in a zone below the curved entry portion and an advantage that flows from this arrangement is that the ambient light outside the lock is blocked from the reader elements and does not affect the sensing done by the reader elements 30.

With the angle a in the preferred range, there is combined the features of vandal thwarting, light blocking, and convenient entry angle, all as outlined and described herein. In addition, there is no need to cut an extra large opening in the door as has been required by earlier reader elements.

As is the usual case in this kind of keycard-operated lock, if the microprocessor and computer connected to the reader elements 30 all housed in in enclosure 12 determine from the inserted card that it is appropriate to yield access to the room involved, then delatching means associated with the knob K are activated or deactivated as is appropriate to permit the user to operate the knob and enter the room.

While this invention has been described in but a single modification, it should be understood that the invention involved is not so limited, but may be defined by the scope of the attached claim language including equivalents thereof.

I claim:

1. A keycard reader for a high security electronic lock exposed to public vandalism and adapted to read a stiffly flexible security keycard and comprising a flat housing for mounting on a vertical surface, the housing having an upwardly and outwardly facing surface formed with an elongate slot for reception of the keycard, guide means in the housing commencing adjacent the slot with a channel portion whose entrant angle is in the range of 20° to 40° to the vertical, the guide means rapidly curving in a radius of about 0.5 inches to a vertical run parallel to the vertical surface, and reading means on the vertical run adjacent said curved portion, whereby the keycard can be conveniently inserted into the slot and the card will bend through the curved portion and straighten out adjacent the reader and, whereby the rapidly curving guide means will thwart the malicious introduction into the slot of rigid foreign bodies.

2. A keycard reader as claimed in claim 1 wherein the entrant angle is 25° from the vertical.

3. A keycard reader as claimed in claim 1 wherein the upwardly and outwardly facing surface is at an angle of about 65° from vertical.

4. A keycard reader as claimed in claim 1 wherein the guideways position the portion of card therein below the reading means in a vertical disposition approximately halfway between the vertical surface and the outside wall of the housing.

* * * * *